United States Patent Office.

WILLIAM W. HUBBELL, OF PHILADELPHIA, PENNSYLVANIA.

*Letters Patent No. 65,387, dated June 4, 1867.*

---

IMPROVED MODE OF DESULPHURIZING ORES AND EXTRACTING GOLD AND SILVER.

---

*The Schedule referred to in these Letters Patent and making part of the same.*

---

TO ALL WHOM IT MAY CONCERN:

Be it known that I, WILLIAM WHEELER HUBBELL, of the city of Philadelphia, and State of Pennsylvania, have invented a new and useful Improvement in the Process of Desulphurizing and Extracting Gold and Silver from Ores; and I hereby declare the following to be a full, clear, and exact description thereof.

The nature of my invention or process consists in first pulverizing the ore, and then saturating it with a solution of saltpetre or nitre, and uniting it with charcoal or carbon as fuel, rendering it combustible, and then burning and desiccating it by the application of fire, which consumes the sulphur, saltpetre, and charcoal together, and leaves the ore both desulphurized and desiccated; and it is then washed with water to float earth and ashes, and the residuum is amalgamated with quicksilver, which unites with the gold and silver, forming an amalgam from which the gold and silver, or either, are extracted in the usual manner; or the residuum may be fused in a retort to separate the metal; or the gold freed by the desiccation may be washed out.

*Process.*

Pulverize the gold and silver ore very fine by passing it through Hubbell & Patton's reducing machinery, or by any other process that will reduce it about as fine as wheat flour. It may be first roasted in bulk if fuel is convenient. Then take saltpetre or nitre and dissolve it in water—twenty gallons of water and twenty pounds of saltpetre—and add twenty pounds of finely pulverized charcoal. When thoroughly dissolved and mixed or saturated with the water, pour this on to one ton, short weight, that is, two thousand pounds of the pulverized ore, in a tight-bottom wood mixing-vat, and stir it well together with a hoe; then spread it out on another or drying-vat in the sun, where let it thoroughly dry. By this process the sulphur in the ore will have united with the saltpetre, and in the presence of the charcoal will have become very combustible, and thus converted into a fuel for releasing itself from the ore, and desiccating the ore on the application of fire. Then throw the ore thus prepared by the shovelful on to an oven-bed of fire-brick, made flat, and heated to a red heat, having an opening on one side, through which to push the desiccated ore off into a vat of water, underneath a chute extending from the opening of the vat. A funnel chimney or flue must be suspended over the oven-bed to conduct off the gases, from which they may be condensed and saved. The ore thus prepared on this fire-bed will burn and become both desulphurized and desiccated, and the gold and silver be partially set free. Push the burnt ore off into the water in the vat below the chute, and also feed on more ore to the oven-bed or fire as the desiccation proceeds. Stir up the desiccated ore in the water-vat, and the ashes and light earthy matter will float off, with a continuous stream of water running in and out of the vat. Shovel out the residuum from the bottom of the vat, and put it in Hubbell's amalgamating machine, or any other amalgamating apparatus, and amalgamate it with quicksilver. The quicksilver, with the ore thus desulphurized and desiccated, will readily unite with the gold or silver, after which done, it can be extracted by the usual process, leaving the gold or silver for bullion. The desiccated ore or residuum may be washed in any apparatus for the purpose, and thus the freed gold washed out instead of amalgamated. The silver ore is best to be amalgamated. In case a furnace is employed to smelt the ore, the ore first pulverized and saturated with the saltpetre alone, or with the powdered charcoal included, may be thrown into a charcoal fire in the furnace, and thus desiccated and set free, or smelted with any suitable flux. The quantity of saltpetre, of course, may be varied with the amount of sulphur in the ore, which, from the nature of the case, can only be ascertained by experiment with each particular ore. The proportions of gunpowder, that is, seventy-five parts of saltpetre, fifteen of charcoal, and ten of sulphur, produce the most perfect combustion of the sulphur quickly; but the proportions I have first given are more economical for general mining purposes, hold the fire longer, and, though slower, produce a more complete desiccation of the ore. The proportions may be more or less varied with the ore. If the sulphur is not consumed add more saltpetre and charcoal. I do not mean to confine myself to any particular proportions or quantity of saltpetre or charcoal to the ton of ore.

What I claim as my invention, and desire to secure by Letters Patent, is—

Saturating the pulverized gold or silver ore with saltpetre, and uniting it with charcoal or carbon in other form, and applying fire, to desulphurize and desiccate the ore, to extract the precious metal, substantially as described.

WM. WHEELER HUBBELL.

Witnesses:
   JAMES ALLEN,
   THOS. ALLEN.